US012590610B2

(12) United States Patent
König et al.

(10) Patent No.: US 12,590,610 B2
(45) Date of Patent: Mar. 31, 2026

(54) JAW CLUTCH HAVING A FREEWHEELING FUNCTION, AND DRIVE ASSEMBLY

(71) Applicant: Magna PT B.V. & Co. KG, Untergruppenbach (DE)

(72) Inventors: Ruben König, Hemsbach (DE); Mario Ott, Korntal-Münchingen (DE)

(73) Assignee: Magna PT B.V. & Co. KG, Untergruppenbach (DE)

( * ) Notice: Subject to any disclaimer, the term of this patent is extended or adjusted under 35 U.S.C. 154(b) by 0 days.

(21) Appl. No.: 19/109,274

(22) PCT Filed: Aug. 18, 2023

(86) PCT No.: PCT/EP2023/072862
§ 371 (c)(1),
(2) Date: Mar. 6, 2025

(87) PCT Pub. No.: WO2024/052094
PCT Pub. Date: Mar. 14, 2024

(65) Prior Publication Data
US 2026/0085729 A1 Mar. 26, 2026

(30) Foreign Application Priority Data
Sep. 7, 2022 (DE) ...................... 10 2022 209 300.3

(51) Int. Cl.
| | |
|---|---|
| *F16D 41/18* | (2006.01) |
| *F16D 11/10* | (2006.01) |
| *F16D 23/14* | (2006.01) |
| *F16D 11/00* | (2006.01) |

(52) U.S. Cl.
CPC ............ *F16D 41/185* (2013.01); *F16D 11/10* (2013.01); *F16D 23/14* (2013.01); *F16D 2011/006* (2013.01); *F16D 2023/141* (2013.01)

(58) Field of Classification Search
CPC .. F16D 41/185; F16D 23/14; F16D 2023/141; F16D 2011/006; F16D 2011/002; F16D 11/10; F16D 11/14
See application file for complete search history.

(56) References Cited

U.S. PATENT DOCUMENTS

| | | | |
|---|---|---|---|
| 11,408,488 B2 | 8/2022 | Shirosaki et al. | |
| 2017/0144541 A1 | 5/2017 | Kincaid et al. | |

FOREIGN PATENT DOCUMENTS

| | | | |
|---|---|---|---|
| DE | 669635 C | 12/1938 | |
| DE | 102012015863 A1 | 5/2014 | |
| DE | 102020202788 B3 | 4/2021 | |

(Continued)

OTHER PUBLICATIONS

European Patent Office, Rijswijk, Netherlands, International Search Report of International Application No. PCT/EP2023/072862, Mailed Dec. 13, 2023, 2 pages.

*Primary Examiner* — Timothy Hannon
(74) *Attorney, Agent, or Firm* — Dickinson Wright PLLC

(57) ABSTRACT

A jaw clutch having a freewheeling function includes an inner element, the end face of which is provided with pull claws, and an outer element, which radially encloses the inner element at least in part and is provided with push claws on its end face. The pull claws and push claws have oppositely inclined wedge structures, and the inner element and the outer element are axially movable, via a shift claw or a shift pin, with their respective claws, towards a counter element having a sprocket or toothed rim.

17 Claims, 6 Drawing Sheets

(56) References Cited

FOREIGN PATENT DOCUMENTS

| EP | 2891826 | A2 | 7/2015 |
| JP | 2015120501 | A | 7/2015 |
| JP | 2016017632 | A | 2/2016 |

$n_{AN} = n_{AB}$ $n_{AN} \leq n_{AB}$ $n_{AN} << n_{AB}$ $n_{AN} \ll n_{AB}$ blocked / rolling in 1st gear stage blocked freewheeling function open / rolling in 2nd gear stage

21

7''

7'   6b

12

6c

17

$n_{AN}$

15

6a

13

$n_{AN}$ $n_{AB}$ $n_{AN} \leq n_{AB}$ blocked / rolling in 1st gear stage blocked freewheeling function open / rolling in 2nd gear stage   Fig. 10

$$n_{AN} = n_{AB}$$

blocked / rolling in 1st gear stage blocked freewheeling function open / rolling in 2nd gear stage

JAW CLUTCH HAVING A FREEWHEELING FUNCTION, AND DRIVE ASSEMBLY

CROSS-REFERENCE TO RELATED APPLICATIONS

This application is a National Stage of International Application No. PCT/EP2023/072862, filed Aug. 18, 2023, which claims priority to DE 10 2022 209 300.3, filed Sep. 7, 2022. The entire disclosures of each of the above applications are incorporated herein by reference.

FIELD

The present disclosure relates to a jaw clutch having a freewheeling function comprising an inner element, which is provided at the end face with pull claws, and an outer element which radially at least partially surrounds the inner element and which is provided at the end face thereof with push claws.

The present disclosure also relates to a drive arrangement for an electrically driven vehicle having two gear stages and a jaw clutch having a freewheeling function.

BACKGROUND

This section provides information related to the present disclosure which is not necessarily prior art.

In an electric vehicle, the power of which is obtained by an electric motor, such as, for example, a hybrid vehicle, the power of which is obtained by switching between an internal combustion engine and the electric motor, and a vehicle which is driven only by the drive power of the electric motor, a power transmission from the electric motor to an axle side is normally carried out only by way of a step-down gear mechanism in which a speed of the electric motor is reduced to that of the axle, the value of which is suitable for operation without providing an additional gear mechanism. This is a result of the fact that the electric motor can produce a drive torque from a low speed range, has a large speed range which can be used for operation and has a simple structure which is a significant selling point for the electric vehicle.

However, it is also advantageous to use a gear mechanism in the electric vehicle. Even for the electric motor, it is difficult to achieve a high degree of efficiency over the entire speed range of the vehicle. Since in particular the speed of the electric motor is higher in the high speed range of the vehicle, the degree of efficiency of the electric motor decreases. As an improvement plan, a two-stage gear mechanism is arranged between the electric motor and the step-down gear mechanism, a side having a low step-down ratio in the two-stage gear mechanism is used in the travel range of the vehicle at a high vehicle speed, and the travel mode of the vehicle at a high vehicle speed can be carried out using the lower speed of the electric motor, which leads to an expansion of the range of use in which the electric motor travels with a high degree of efficiency. As such a two-stage gear mechanism, JP 2016-017632 A proposes the gear mechanism with a planetary gear mechanism for carrying out the two-stage gear mechanism. The planetary gear mechanism comprises three rotation elements and the three rotation elements are a carrier, which pivotally supports a plurality of pinions, a sun gear and a ring gear. When the vehicle is travelling in the low speed range, a friction clutch is not engaged when a jaw clutch is engaged, and the ring gear is secured by the engagement of the jaw clutch on the housing. When the vehicle is travelling in the high speed range the friction clutch is engaged when the jaw clutch is not engaged, the ring gear is released from the housing and rotates together with the sun gear and the carrier, and the step-up ratio is 1.0 (uniform speed (uniform movement)). The step-up ratio in the travel range at a high vehicle speed is adjusted in such a manner that it is lower than that in the travel range at a low vehicle speed, which leads to a relative reduction of the speed of the electric motor in the travel range at a high vehicle speed. Accordingly, the highly efficient drive range of the electric motor in the travel range at a high travel speed can be expanded, and travelling at a high travel speed is carried out with a high degree of efficiency. When shifting from the second gear to the first gear (speed reduction), as a result of the structure of the jaw clutch there is produced a gear mechanism shock since the engagement of the clutch is carried out in accordance with the relative rotation of the engaged gear face, whilst the jaw clutch moves from a non-engaged state to an engaged state.

DE 10 2020 202 788 B3 sets out a drive train having a two-stage gear mechanism having an electric machine, a gear input shaft and a gear mechanism for configuring a first and a second gear stage, wherein the first gear stage is provided with a freewheel and the second gear stage is provided with a centrifugal-force-controlled friction clutch, wherein a first clutch connects the ratchet of the first gear stage to the gear mechanism input shaft, and a second clutch connects the ratchet of the second gear stage to the gear mechanism input shaft.

U.S. Pat. No. 11,408,488 B2 relates to a two-stage gear mechanism which is arranged along an output axle of an electric motor in a vehicle which uses the electric motor for wheel driving having: a planetary gear mechanism which comprises three rotary elements, which include a carrier which pivotably supports a plurality of pinions, and a plurality of gears which have a different number of teeth and are in engagement with the pinions, and uses a first gear speed mode in which a first rotary element which is selected from the three rotary elements, is secured to a housing side, and the power transmission is carried out using a step-up ratio, the value of which is 1.0 and which is obtained between a second rotation element and a third rotation element, and a second speed mode in which the force transmission is carried out using the transmission ratio, the value of which is 1.0 and which is obtained by input and output at one from the second rotation element and the third rotation element or by integral rotation of one from the second rotation element and the third rotation element with the first rotation element; a jaw clutch which couples with the rotation elements of the planetary gear mechanism in order to select a side speed mode with a relatively low transmission ratio between the first speed mode and the second speed mode, a friction clutch which couples with the rotation elements of the planetary gear mechanism in order to select a side speed mode with a relatively high transmission ratio between the first speed mode and the second speed mode; and a one-way ratchet clutch in order to prevent a speed drop when switching between the first speed mode and the second speed mode, wherein engagement portions of the jaw clutch and a ratchet engagement portion of the one-way ratchet clutch are arranged at the same speed phase position.

The ratchet clutch may in this instance be a disruptive source of noise when it is overrun.

DE 669 635 C sets out a lockable freewheel clutch in which the force transmission is carried out by way of surfaces which lie one on the other. The lockable freewheel clutch is substantially characterized by two jaw clutches which serve to connect the driving shaft to the driven shaft and which are arranged concentrically one inside the other and the non-displaceable portions of which rest on one shaft, whilst the displaceable portions can again be displaced relative to each other but are secured against rotation with respect to each other. The claws of the clutch which engages first are configured in known manner so that they carry or are carried only in one rotation direction, but slide away from each other over their entire length in the other rotation direction, whilst the other jaw clutch which engages later cancels the freewheeling action of the first jaw clutch.

DE 10 2012 015 863 A1 relates to a step gear mechanism for a motor vehicle, having a gear input which can be connected to a drive motor, and having a gear output which can be connected to a driven axle of a motor vehicle, wherein the step gear mechanism is constructed to configure at least a first and one other gear stage, wherein a force transmission is carried out from the gear mechanism input to the gear mechanism output in the first gear stage via a first clutch arrangement, wherein a force transmission is carried out from the gear mechanism input to the gear mechanism output in the additional gear stage via a second clutch arrangement, and wherein the second clutch arrangement has a powershift clutch. A control in which a pressure overlap of two powershift clutches is required is not necessary as a result of the freewheel clutch.

SUMMARY

An object of the present disclosure is to provide an improved configuration of the jaw clutch with an integrated freewheel, which enables a rapid, quiet shifting sequence but is structurally small.

The object is achieved with a jaw clutch having a freewheeling function, comprising an inner element, which is provided at the end face with pull claws, and an outer element which at least partially radially surrounds the inner element and which is provided at the end face thereof with push claws, wherein pull and push claws have opposing wedge structures, and wherein the inner element and the outer element can be axially displaced via a shift fork with the respective claws in the direction toward a counter-element having a sprocket.

The combination of the jaw clutch with a freewheeling function saves components and can ensure a rapid gear change. It is also possible for the push and pull claws to be geometrically interchanged, that is to say, for push claws to be fitted internally and push claws externally on the respective end faces of the inner or the outer element.

The jaw clutch having a freewheeling function has a single-piece shift fork which activates both the inner element and the outer element, wherein the relative movement of the two elements with respect to each other is limited by a collar of the inner element which is arranged at the side, facing away from the counter-piece, of the inner element.

Advantageously, the shift fork which bears on the inner element is guided via a spring device resiliently in a shift roller track.

It is advantageous that locking springs engage in an inner groove of the inner element.

The jaw clutch with a freewheeling function enables in combination with a friction clutch upshift and downshift operations without interruptions of traction.

The jaw clutch with a freewheeling function enables at least one sequence of an upshift operation which is rapid and simple to control.

In an exemplary embodiment, a sequence of a downshift operation which is rapid and simple to control is also possible.

The object is also achieved with a drive arrangement having an electric machine, a clutch, two gear stages and a jaw clutch having a freewheel.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

FIG. 10 shows the position of the shifting movements in the situation illustrated in FIG. 9.

DETAILED DESCRIPTION

Figure 13:
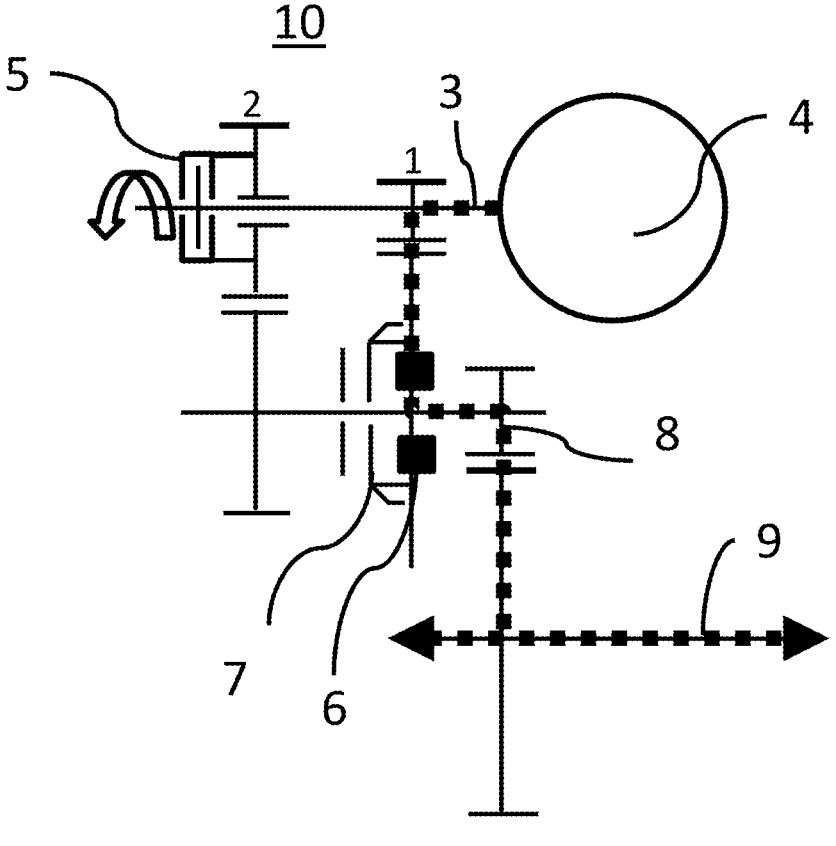
FIG. 13 shows an exemplary gear mechanism with traction in a first gear stage.
Figure 14:
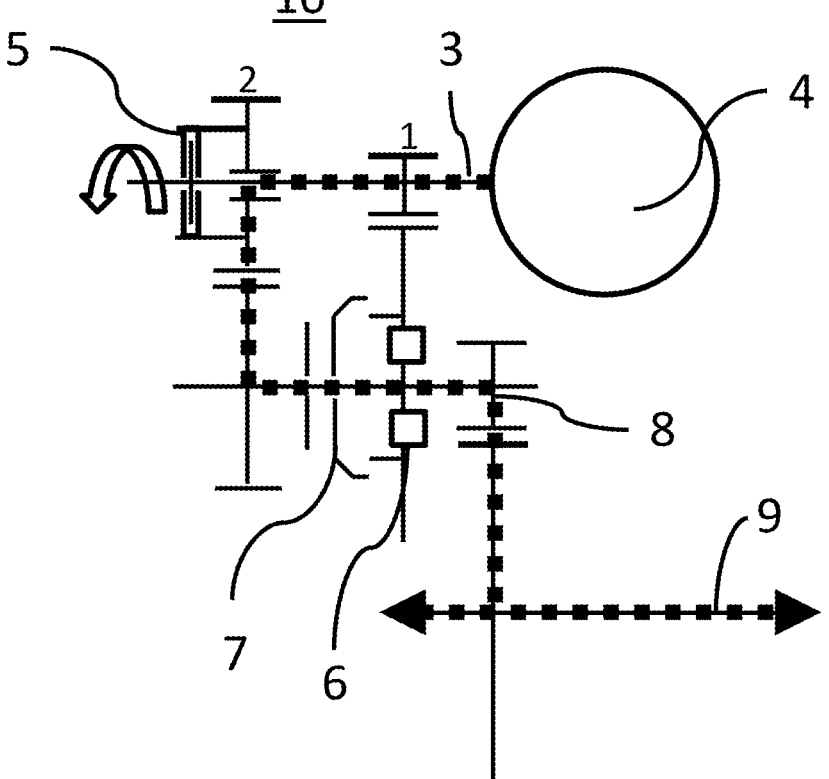
FIG. 14 shows the same exemplary gear mechanism with traction in a second gear stage.

FIGS. 13 and 14 show by way of example a drive arrangement 10 which comprises a friction clutch 5 and a positive-locking element 7, 6. Previously, jaw clutches 7 and conventional freewheel systems 6 are combined in the gear mechanism architectures in order to enable recovery and backward travel via the shifting with a jaw clutch 7 and at the same time a rapid and simple shifting procedure under pulling conditions via a freewheel system 6.

In the selected exemplary embodiment, an electric machine 4 drives an input shaft 3 on which a first wheel set for the first gear stage 1 and a second wheel set for the second gear stage 2 are provided. Adjacent to the second gear stage 2, the friction clutch 5 is introduced. The output shaft 9 is connected via an intermediate shaft 11 and a drive wheel set 8. On the intermediate shaft 11 in addition to the wheel sets of the two gear stages a shift claw 7 and a freewheel 6 are mounted.

In FIG. 13, the force path for the first gear stage 1 is shown. The friction clutch 5 is open and the jaw clutch 7 is closed. In FIG. 14, the force path for the second gear stage 2 is illustrated. The friction clutch 5 is closed, the jaw clutch 7 is open and the freewheel 6 is overrun, thus transmits no torque.

Figure 1:
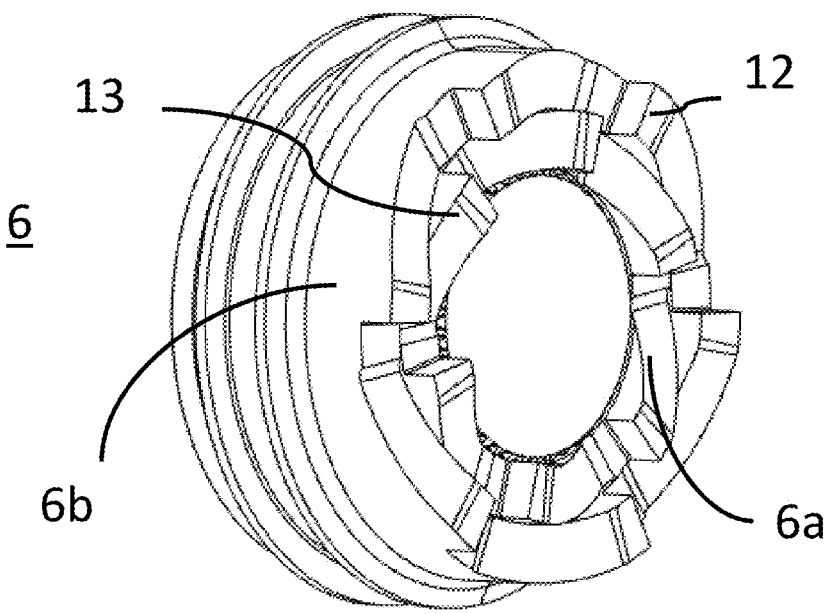
FIG. 1 shows a view of a jaw clutch having a freewheeling function.

FIG. 1 shows a view of two portions of a jaw clutch with a freewheeling function 6 which comprises an inner element 6*a* and an outer element 6*b*. The inner element 6*a* has pull claws 13 along the end face thereof. In the embodiment illustrated, 6 pull claws 13 are provided. The outer element 6*b* has in contrast push claws 12 which extend along the end face. The push claws 12 differ from the pull claws 13 as a result of the direction in which the teeth face and consequently the direction in which torque can be transmitted.

The pull claws 13 and the push claws 12 are configured in an asymmetrically wedge-like manner and protrude from the respective end faces of the inner element and the outer element. The wedge-like configuration is produced as a result of the fact that the claws protrude from the annular face of the end faces. The claws thereby transmit torque in one direction, wherein no torque is transmitted in the other direction in each case. The inner element 6*a* and the outer element 6*b* are arranged in opposing directions in terms of their orientation with respect to the torque transmission.

The inner element 6*a* transmits torque in a pulling direction, whilst the outer element 6*b* transmits torque in the pushing direction. If both elements are engaged simultaneously, as illustrated in FIG. 2, no torque can be transmitted in both directions, as is the case with a conventional jaw clutch.

Figure 2:
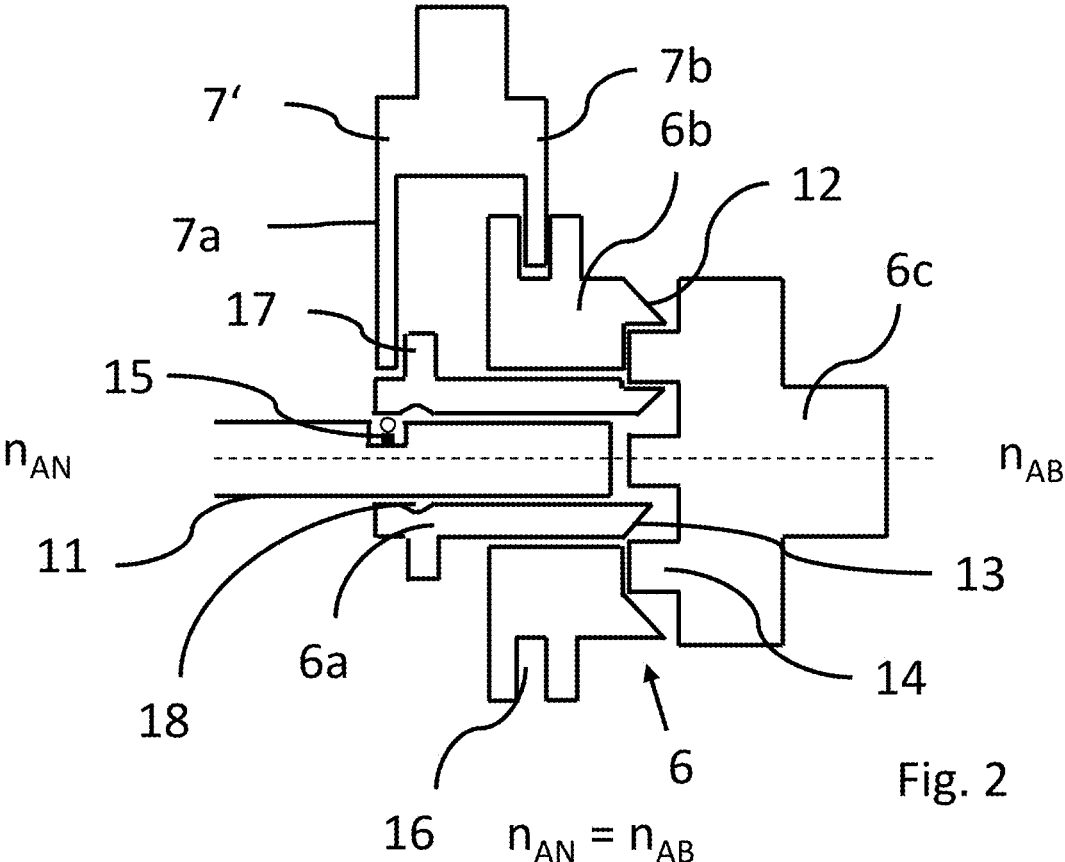
FIG. 2 shows an embodiment of a jaw clutch in the completely closed state.

In FIG. 2, the structure of the jaw clutch with a freewheeling function is shown in greater detail.

The inner element 6*a* is radially surrounded by outer elements 6*b*. The elements 6*a* and 6*b* are connected to each other in an axially displaceable and rotationally secure manner. The inner element 6*a* has a collar 17 and an inner groove 18. The outer element 6*b* has a groove 16 on the outer diameter. At the outlet side, a counter-element 6*c* in which the pull claws 13 and push claws 12 can engage can be seen. The shift fork 7' has a fork element 7*a* for the inner element 6*a* and a fork element 7*b* for the outer element 6*b*. The fork element 7*b* for the outer element 6*b* engages in this instance in the groove 16 of the outer element 6*b*. The fork element 7*a* for the inner element 6*a* bears on the collar 17 of the inner element 6*a* from the outer side. In the closed function of the freewheel which corresponds to a jaw clutch, both the inner element 6*a* and the outer element 6*b* are in engagement with the sprocket 14 of the counter-element 6*c*.

The speeds of the input side $n_{AN}$ and the output side $n_{AB}$ are identical.

Figures 3, 4:
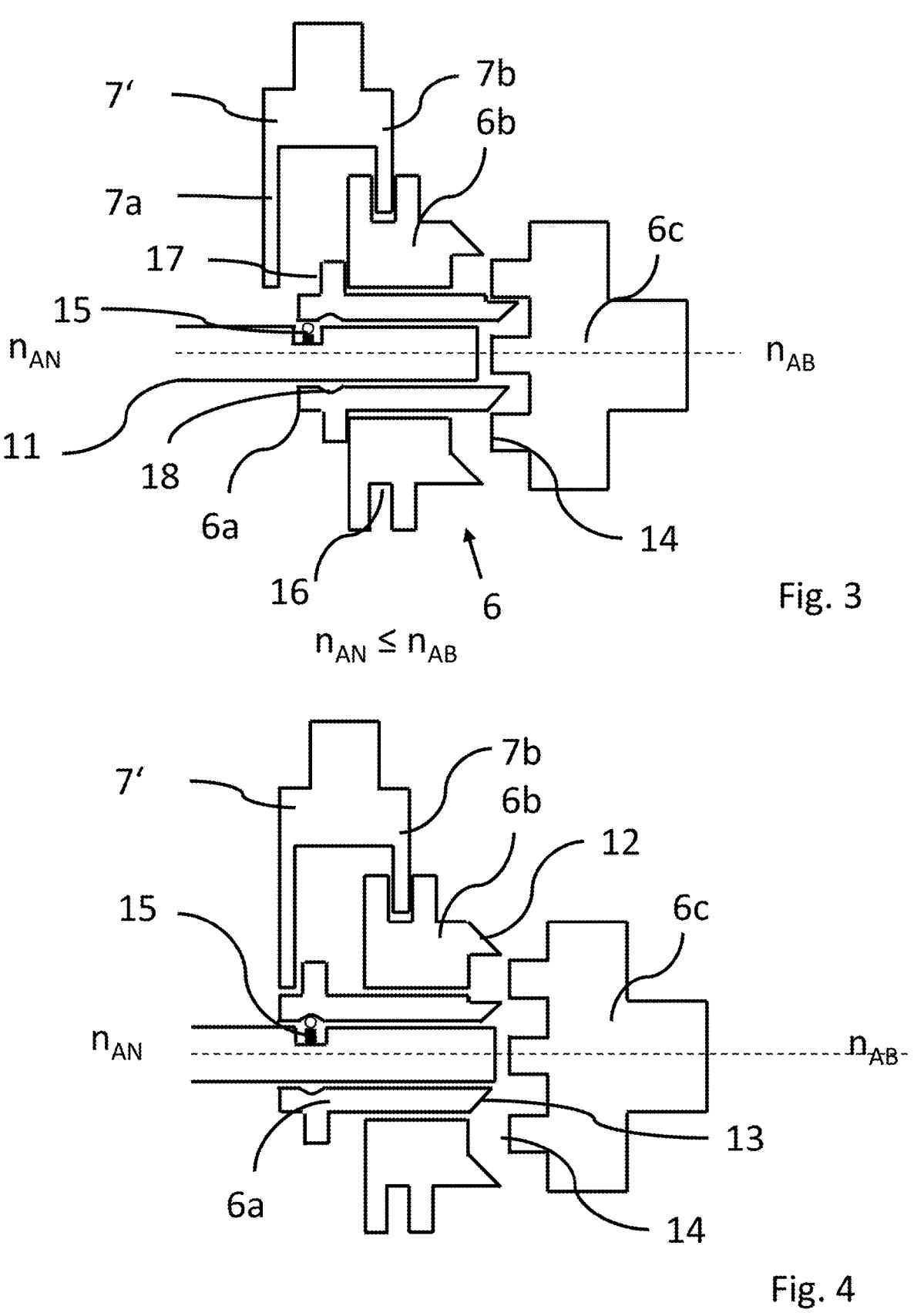
FIG. 3 shows the jaw clutch with closed pull claws.
FIG. 4 shows the jaw clutch in the completely open state.

In FIGS. 3 and 4, the processes with a rapid pulling upshift are shown.

The outer element 6*b* is first configured for a rapid pulling upshift 3. This outer element 6*b* is in this instance load-free since the torque is transmitted via the inner element 6*a*. To this end, the shift fork 7' moves the fork element 7*b* for the outer element away from the counter-element 6*c*, see FIG. 3.

After the torque superimposition on the second gear as a result of the closure of the friction clutch 5, the speed ratios change at the jaw clutch 7. The drive side reduces the speed $n_{AN}$ thereof and as soon as the drive speed MAN is less than the output speed $n_{AB}$, the inner element 6*a* of the jaw clutch as a result of the configuration of the pull claws 13 of the inner element 6*a* is automatically pushed out.

A locking spring 15 then engages in the inner groove 18 of the inner element 6*a* in order to support the disengagement operation up to the end position and to prevent a ratcheting of the claws.

The shift fork 7' activates the two elements, the inner element 6*a* and the outer element 6*b*, at the same time. Consequently, both the pushing claws 12 and the pulling claws 13 can be engaged at the same time. Two positions for the shift claw 7' are provided for disengagement. As illustrated in FIG. 3, in a first position only the outer element 6*b* with the push claws 12 is disengaged. In a second position, as illustrated in FIG. 4, the outer element 6*b* is actively disengaged. The shift fork 7 is located in the same position in both FIGS. 3 and 4. Only 6*b* is actively disengaged. The disengagement of 6*a* is carried out by pushing out at a corresponding speed ratio in a state supported by the locking spring. An active disengagement of 6*a* by the shift fork is not illustrated in the drawing.

However, it would be possible, by way of a second shift fork position further left in the drawing. In this instance, the outer element 6*b* would slide further to the left and in this instance carry the inner element 6*a* on the collar 17.

Figures 5, 6, 7:
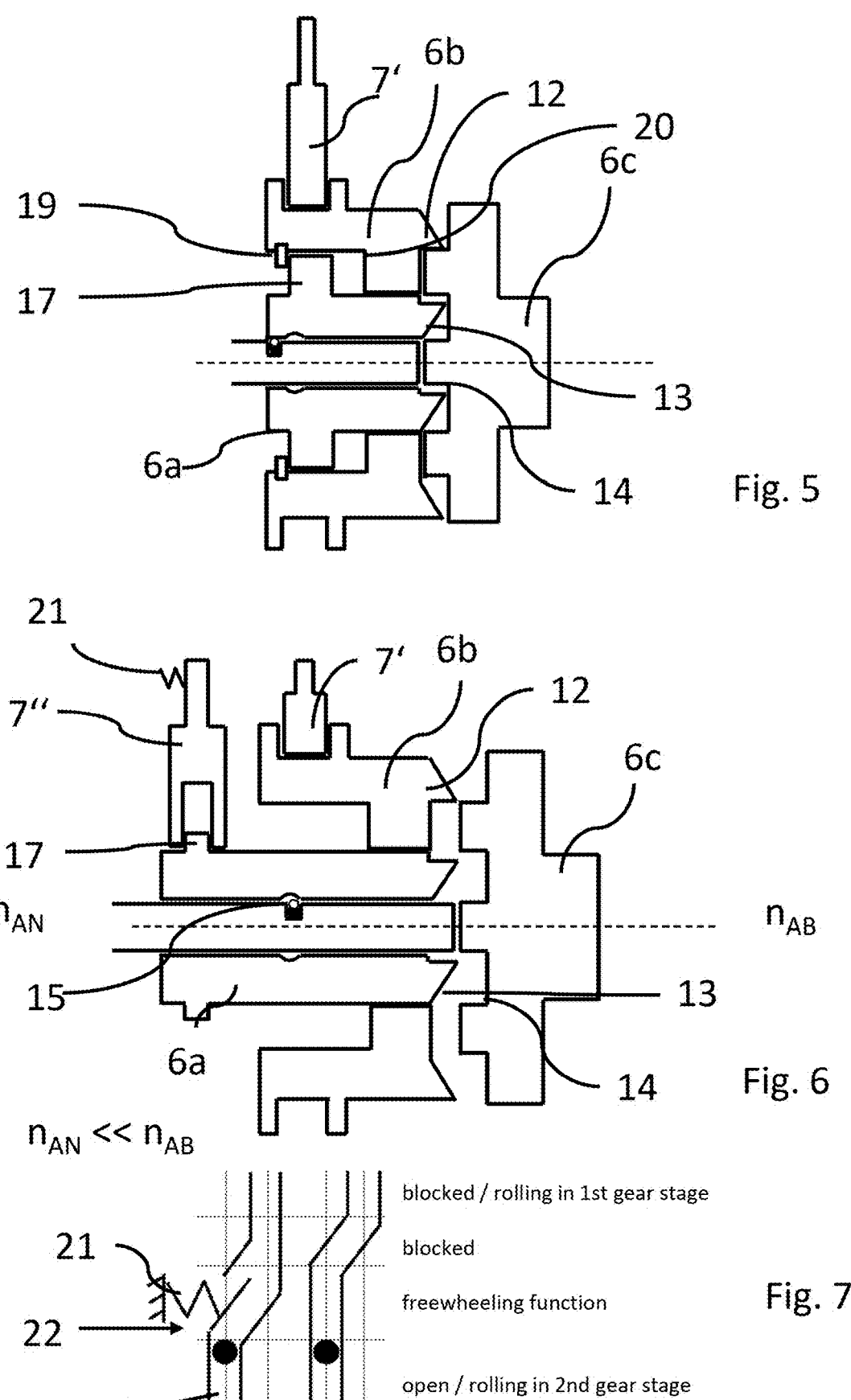
FIG. 5 shows an embodiment of a jaw clutch according to the present disclosure in the completely closed state.
FIG. 6 shows an embodiment of a jaw clutch in the completely open state.
FIG. 7 shows the sequence of the shifting movements for the embodiment of FIG. 6.

FIG. 5 shows an embodiment according to the present disclosure of a jaw clutch with a freewheeling function.

The shift fork 7' of FIGS. 3-4 is replaced with a shift fork 7' having only one fork element which engages in the groove 16 of the outer element 6*b*.

The outer element 6*b* comprises radially the inner element 6*a*, wherein the collar 17 of the inner element 6*a* can move in an axially displaceable manner in a recess 20 of the outer element. The elements 6*a* and 6*b* are connected to each other in a rotationally secure manner.

A carrier/securing ring 19 forms a stop of the axial movement of the inner element 6*a* in the recess 20. With this simplified shift fork 7' of FIG. 5, a carrier function is implemented and enables the first gear to be disengaged or engaged when stationary.

The active disengagement of both elements, for example, when stationary, is also possible with the variant of FIGS. 3-4. In both cases, this is produced by way of a second position of the shift fork "further left".

The advantage of the variant in FIG. 5 is a more compact and cost-effective construction. The shift fork 7' of FIG. 5 requires only one fork element and the entire structural length of the clutch can potentially be reduced since the two elements are nested completely one inside the other.

In the variants described above in FIGS. 3-4, pull and push claws are engaged at the same time during the engagement operation. In this instance, the initial active direction when engaging the claws is dependent on the prefix of the differential speed during the engagement operation. If the drive speed $n_{AN}$ is less than the output speed $n_{AB}$, the push claw 12 which acts in the pushing direction first transmits a torque. If the drive speed is greater than the output speed, the push claw 13 which acts in the pulling direction first transmits a torque.

In practice, the prefix of the differential speed as a result of imprecisions of the data detection or dynamic effects is not always known precisely.

The third embodiment therefore represents an improvement.

The mechanical configuration of the activation system may alternatively be carried out in such a manner that, in addition to the disengagement operation, the engagement of the claws is carried out sequentially via two shift pins or shift claws which can be controlled separately.

This configuration can simplify the controller configuration and mechanical design and have a positive influence on shifting time and comfort. In this instance, for the control of the components, comprising the electric machine, the clutch and the shifting system, the circumstance is intended to be used at any time that the pull claw 13 acting in the pull direction first transmits load. As soon as the pull claw 13 acting in the pull direction is engaged and transmits the drive torque, the push claw 12 acting in the push direction can be engaged in a load-free manner. Furthermore, by introducing resilience by way of a spring mechanism 21 in the activation system of the pull claw 13, a freewheeling functionality is implemented. This may in particular be advantageous for the downshifting in order in particular to compensate for imprecisions of the component "clutch" and consequently to further increase shifting time and comfort. In this instance, the operating method of a freewheel is used.

FIG. 6 shows a shift fork 7' which engages in a groove 16. Separately from this shift fork 7', a second shift fork 7" which surrounds the collar 17 of the inner element is provided for the inner element 6a. The jaw clutch is completely open and the vehicle moves in the second gear stage. In FIG. 7, the contours of the shift roller are illustrated schematically. Four regions which the shift claw can occupy by guiding in the shift roller can be seen. The completely open position is marked in FIG. 7 by way of the two dots.

Figures 8, 9:
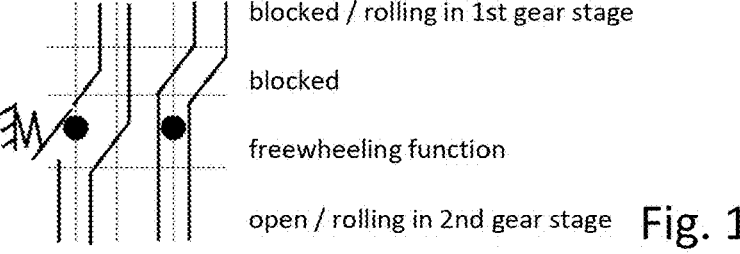
FIG. 8 shows the embodiment of FIG. 6 with an open outer element.
FIG. 9 shows the embodiment of FIG. 6 with open elements.

FIGS. 8 and 9 show a situation in the engagement phase of the downshifting from the second gear into the first gear. During the engagement operation of the pull claw 13, it then independently transmits torque when the speed of the drive side is greater than the speed of the output side. This will be taken into account during the configuration of the speed controller for the electric machine and clutch and during the control of the pull claw 13. The shift fork 7" of the pull claw 13 can by using the freewheeling functionality already be moved into the engagement position before reaching the target speed. As long as the drive side rotates more slowly than the output side, the pull claw 13 is repelled. When an equal speed and a claw-on-gap position are reached, the pull claw 13 independently engages as a result of the spring mechanism 21.

The requirements for the precision of the clutch control and the control of the electric machine 4 are thereby significantly reduced. As a result, the shifting time for the engagement of the jaw clutch is also reduced.

The resilience in the activation system of the jaw clutch 7 is in the exemplary embodiment introduced into the shift roller, as shown in FIG. 10. In this instance, a portion 22 of the shift roller track 23 is configured to be resiliently axially displaceable in order to enable the jaw clutch 7' and consequently the pull claw 13 in this region the freedom of movement for the freewheeling function.

Figure 11:
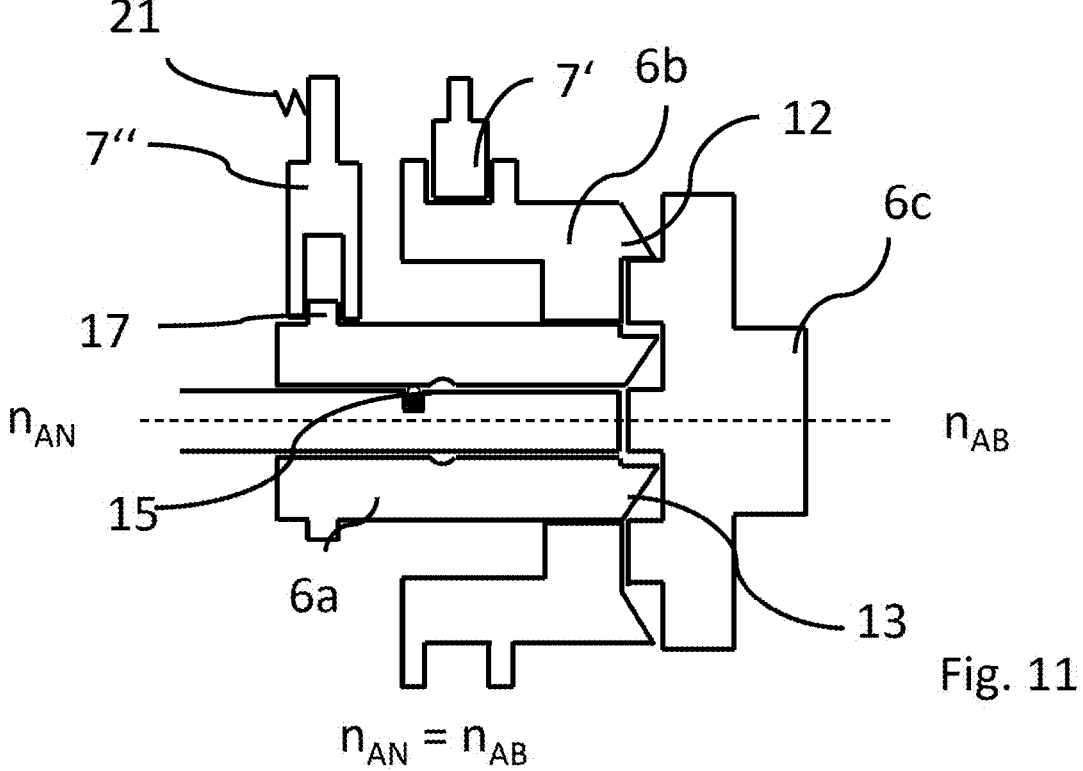
FIG. 11 shows the embodiment of FIG. 6 with closed elements.
Figure 12:
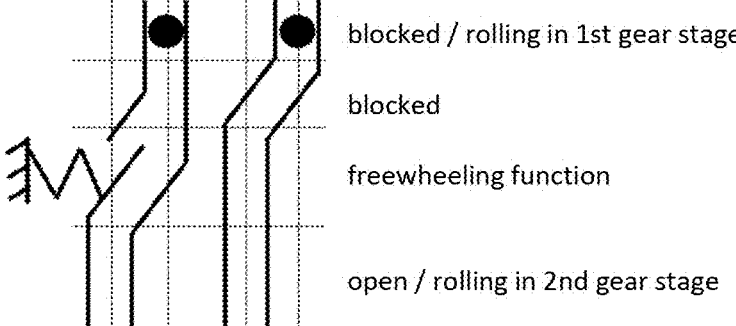
FIG. 12 shows the shifting position according to FIG. 11.

FIG. 11 shows a completely closed jaw clutch in which the inner element 6a and the outer element 6b are completely connected to the counter-element. In this situation, a drive is possible in the first gear stage. FIG. 12 again shows the position of the shift claw with respect to the tracks in the shift roller.

A person of skill in the art will readily appreciate that aspects of the various embodiments not explicitly described with reference to another embodiment may also be applicable to said embodiment, except where such structure or operation clearly conflict.

LIST OF REFERENCE NUMERALS

1 Wheel set of the first gear stage
2 Wheel set of the second gear stage
3 Input shaft
4 Electric machine
5 Friction clutch
6 Freewheel system
6a Inner element
6b Outer element
6c Counter-element
7 Jaw clutch
7', 7" Shift fork
7a Fork element for inner element

7b Fork element for outer element
8 Drive wheel set
9 Output shaft
10 Drive train
11 Intermediate shaft
12 Push claws
13 Pull claws
14 Sprocket
15 Locking springs
16 Groove
17 Collar
18 Inner groove
19 Carrier
20 Recess
21 Spring mechanism
22 Portion
23 Shift roller track

The invention claimed is:

1. A jaw clutch having a freewheeling function comprising:
an inner element, which includes pull claws at an end face of the inner element, and
an outer element which at least partially radially surrounds the inner element and which includes push claws at an end face of the outer element,
wherein pull and push claws have opposing wedge structures and are also mutually interchangeable, and
wherein the inner element and the outer element, via a shift fork, are axially shiftable, with their claws toward a counter-element having a sprocket or toothed rim,
wherein the shift fork engages in a groove of the outer element and wherein the inner element is moveable relative to the outer element in a recess of the outer element, wherein a carrier limits an extent of travel of the inner element relative to the outer element,
wherein the carrier is arranged at an end of the inner element that is axially opposite relative to the end face and away from the counter-element.

2. The jaw clutch as claimed in claim 1, wherein locking springs engage in an inner groove of the inner element when the inner element is disengaged from the counter element.

3. The jaw clutch as claimed in claim 1, wherein an upshift operation without interruptions of traction is carried out.

4. The jaw clutch as claimed in claim 1, wherein a downshift operation without interruptions of traction is carried out.

5. The jaw clutch as claimed in claim 1, wherein the carrier is a securing ring, wherein the securing forms a stop of axial movement of the inner element relative to the outer element in a direction away from the counter element.

6. The jaw clutch as claimed in claim 5, wherein the securing ring is axially fixed relative to the outer element and disposed within the recess.

7. The jaw clutch as claimed in claim 6, wherein the inner element includes a radially extending collar, where the collar abuts the securing ring when the inner element is shifted relative to the outer element in a direction away from the counter element.

8. The jaw clutch as claimed in claim 1, wherein the shift fork has only a single fork element, where the single fork element engaged the groove of the outer element.

9. The jaw clutch as claimed in claim 1, wherein the inner element and the outer element are connected to each other in a rotationally secure manner.

10. The jaw clutch as claimed in claim 1, wherein movement of the shift fork in a first direction axially through a first extent of travel away from the counter element actively disengages the outer element.

11. The jaw clutch as claimed in claim 10, wherein further movement of the shift fork in the first direction axially beyond the first extent of travel away from the counter element actively disengages the inner element from the counter element.

12. The jaw clutch as claimed in claim 10, wherein, following the movement of the shift fork and active disengagement of the outer element, the inner element disengages to a disengaged state from the counter element in response to a predetermined corresponding speed ratio.

13. The jaw clutch as claimed in claim 12, wherein the inner element is supported in the disengaged state by a locking spring disposed in an inner groove of the inner element.

14. The jaw clutch as claimed in claim 13, wherein movement of the shift fork in an axial direction toward the counter element actively moves the outer element toward the counter element, and the carrier acts on the inner element and shifts the inner element toward the counter element.

15. The jaw clutch as claimed in claim 1, wherein the inner element is fully nested within an axial extent of the outer element, wherein the inner element does not project axially beyond the outer element.

16. The jaw clutch as claimed in claim 1, wherein the shift fork does not engage the inner element.

17. A drive arrangement having an electric machine, a clutch, two gear stages and the jaw clutch as claimed in claim 1.

\* \* \* \* \*